United States Patent
Wu et al.

(10) Patent No.: US 11,128,230 B2
(45) Date of Patent: Sep. 21, 2021

(54) SYNCHRONOUS POWER CONVERTER SYSTEM

(71) Applicant: ANPEC ELECTRONICS CORPORATION, Hsinchu (TW)

(72) Inventors: Tse-Hsu Wu, Hsinchu (TW); Fu-Chuan Chen, Hsinchu (TW); Yun-Chiang Chang, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/851,788

(22) Filed: Apr. 17, 2020

(65) Prior Publication Data
US 2021/0203238 A1    Jul. 1, 2021

(30) Foreign Application Priority Data

Dec. 25, 2019   (TW) .................. 108147529

(51) Int. Cl.
*H02M 3/158*    (2006.01)
*H02M 3/335*    (2006.01)

(52) U.S. Cl.
CPC ..... *H02M 3/33592* (2013.01); *H02M 3/1584* (2013.01); *H02M 3/1588* (2013.01)

(58) Field of Classification Search
CPC .......... H02M 3/33592; H02M 3/1584; H02M 3/1588
See application file for complete search history.

(56) References Cited

U.S. PATENT DOCUMENTS

| | | | |
|---|---|---|---|
| 10,256,727 B2* | 4/2019 | Tao | H02M 1/08 |
| 10,270,343 B2* | 4/2019 | Nguyen | H02M 3/1584 |
| 10,637,354 B1* | 4/2020 | Wu | H03K 7/08 |
| 2020/0412233 A1* | 12/2020 | Shen | H02M 3/1584 |

* cited by examiner

*Primary Examiner* — Kyle J Moody
(74) *Attorney, Agent, or Firm* — Li & Cai Intellectual Property (USA) Office

(57) ABSTRACT

A synchronous power converter system is provided. The system includes a processor circuit and a plurality of power converters. The processor circuit outputs a plurality of clock signals having the same frequency. The power converters respectively receive the clock signals. Each of the power converters includes an oscillator circuit, a frequency detector circuit, a compensator circuit, a controller circuit, and a switch circuit. The oscillator circuit outputs an oscillation signal. The frequency detector circuit receives the clock signal and the oscillation signal and detects a clock frequency of the clock signal and an oscillation frequency of the oscillation signal to output a frequency detected signal. The compensator circuit outputs a compensating signal according to the frequency detected signal. The controller circuit controls the switch circuit according to the compensating signal.

10 Claims, 7 Drawing Sheets

SYNCHRONOUS POWER CONVERTER SYSTEM

CROSS-REFERENCE TO RELATED PATENT APPLICATION

This application claims the benefit of priority to Taiwan Patent Application No. 108147529, filed on Dec. 25, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a synchronous power converter system for a multi-mode DC-DC converter.

BACKGROUND OF THE DISCLOSURE

Various power converters are widely used to supply modulated voltages and currents to various electronic products. The power converters are required to meet power management standards and energy conservation standards for environmental pollution prevention. Power consumption of a system during an operation period is required to meet the power management standards. The system only consumes a small amount of power during a non-operation period of the system. The power converter applied to a light load must meet power saving requirements specified in the power management standards.

People choose different types of power converters based on characteristics of the power converters. For example, a current mode DC-DC converter has a constant frequency and is suitable for products such as a digital subscriber line (DSL) and an automotive system, which are sensitive to power noise. However, the current mode DC-DC converters of a conventional system have disadvantages of frequency offset and slow response, even if they are manufactured by an optimal process. The current mode DC-DC converters having different frequencies from each other affect multiple transmission channels, which results in a poor overall performance of the conventional system.

SUMMARY OF THE DISCLOSURE

In response to the above-referenced technical inadequacies, the present disclosure provides a synchronous power converter system, which includes a processer circuit and a plurality of power converters. The processer circuit is configured to output a plurality of clock signals having the same frequency. The power converters are configured to respectively receive the plurality of clock signals. Each of the power converters includes an oscillator circuit, a frequency detector circuit, a compensator circuit, a controller circuit and a switch circuit. The frequency detector circuit is connected to the processer circuit, the oscillator circuit and the compensator circuit. The compensator circuit is connected to the controller circuit. The oscillator circuit outputs an oscillation signal. The frequency detector circuit receives the clock signal and the oscillation signal and detects a clock frequency of the clock signal and an oscillation frequency of the oscillation signal to output a frequency detected signal. The compensator circuit outputs a compensating signal according to the frequency detected signal. The controller circuit controls the switch circuit according to the compensating signal.

In certain embodiments, the compensator circuit includes an error amplifier connected to the frequency detector circuit and the controller circuit. The switch circuit is connected in series with an inductor and an output capacitor and grounded through the inductor and the output capacitor. A voltage of a node between the inductor and the output capacitor is an output voltage of the power converter. The frequency detected signal outputted by the frequency detector circuit includes a voltage controlling signal for controlling the error amplifier to output an error amplified signal according to a first reference voltage and the output voltage. The controller circuit is configured to control the switch circuit according to the error amplified signal.

In certain embodiments, a node between the inductor and the output capacitor is connected to a voltage divider circuit. The voltage divider circuit is configured to divide the output voltage to output a feedback voltage. The error amplifier is configured to output the error amplified signal according to the feedback voltage and the first reference voltage.

In certain embodiments, the compensator circuit includes a first compensation resistor, a first compensation capacitor and a second compensation capacitor. The first compensation resistor is connected to an output terminal of the error amplifier and grounded through the first compensation capacitor. Two terminals of the second compensation capacitor are respectively connected to the output terminal of the error amplifier and are grounded.

In certain embodiments, each of the power converters further includes a comparator. The comparator is connected to the error amplifier and configured to compare a voltage of the error amplified signal and a second reference voltage to output a comparing signal. The controller circuit is configured to control the switch circuit according to the comparing signal.

In certain embodiments, the switch circuit is connected to an input voltage source through a resistor. Each of the power converters further includes a current sensing amplifier configured to detect a current flowing through the resistor to output a current detected signal. The comparator is configured to compare the voltage of the error amplified signal with the second reference voltage generated by the current detected signal to output the error amplified signal.

In certain embodiments, the frequency detector circuit includes a first flip-flop, a second flip-flop and a logic gate. The first flip-flop is connected to the processor circuit. The second flip-flop is connected to the oscillator circuit. A reset terminal of the first flip-flop and a reset terminal of the second flip-flop are connected to an output terminal of the logic gate. An output terminal of the first flip-flop is connected to one input terminal of the logic gate and a control terminal of a first switch. A first terminal of the first switch is connected to a first current source. A second terminal of the first switch is connected to a first terminal of a second switch. A control terminal of the second switch is connected to another input terminal of the logic gate and an output terminal of the second flip-flop. A second terminal of the second flip-flop is connected to a second current source. A node between the second terminal of the first switch and the first terminal of the second switch is connected to the compensator circuit.

In certain embodiments, the first flip-flop and the second flip-flop are D-type flip-flops, and the logic gate is an AND gate.

In certain embodiments, the frequency detector circuit further includes a filter circuit. The filter circuit is connected to the node between the second terminal of the first switch and the first terminal of the second switch, and connected to the controller circuit.

In certain embodiments, the filter circuit includes a first filter resistor, a first filter capacitor and a second filter capacitor. The first filter resistor is connected to the node between the second terminal of the first switch and the first terminal of the second switch. The first filter resistor is connected in series with the first filter capacitor and grounded through the first filter capacitor. The second filter capacitor is connected in parallel with a series circuit of the first filter resistor and the first filter capacitor.

Therefore, the present disclosure provides the synchronous power converter system, which provides the plurality of clock signals having the same clock frequency respectively to the plurality of power converters to trigger the power converters to operate synchronously. When the clock frequency of the clock signal increases to high frequency, the transconductance gain of the error amplifier is increased such that the bandwidth of the power converter increases. As a result, the drop of the output voltage of the power converter reduces. Therefore, the load transient performance of the power converter is improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
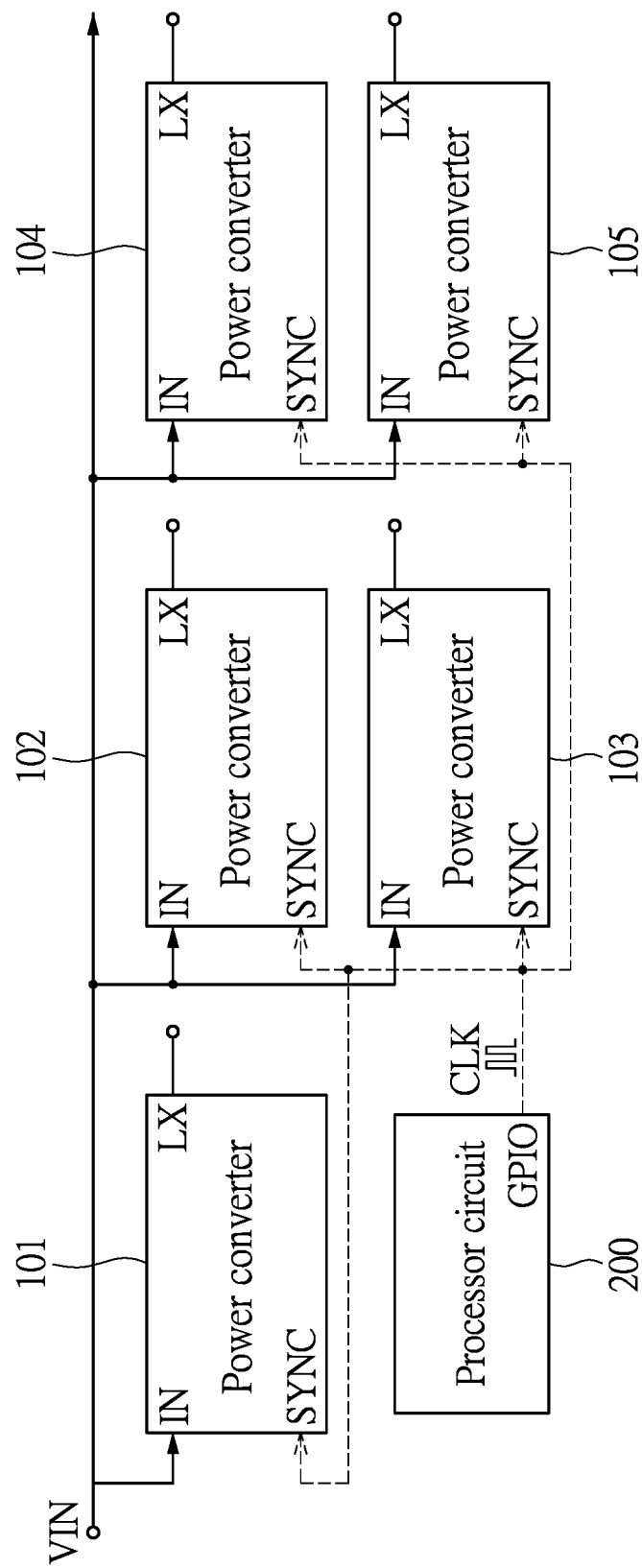
FIG. 1 is a circuit layout diagram of a plurality of power converters and a processor circuit of a synchronous power converter system according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit layout diagram of a plurality of power converters and a processor circuit of a synchronous power converter system according to an embodiment of the present disclosure.

A plurality of current-mode DC-DC converters of a conventional system have different frequencies and thus affect multiple transmission channels. In order to solve this problem, as shown in FIG. 1, in the embodiment, the synchronous power converter system includes a processor circuit 200 for a plurality of power converters 101 to 105. In the embodiment, the five power converters 101 to 105 are current mode DC-DC converters, but the present disclosure is not limited thereto. In practice, the number and type of the power converters may be adjusted according to actual requirements.

The processer circuit 200 is connected to the power converters 101 to 105. For example, the processer circuit 200 may be a central processing unit (CPU), a system-onchip (SoC) integrated circuit, or a field programmable logic gate array (FPGA) integrated circuit, but the present disclosure is not limited thereto. The processer circuit 200 is configured to output a plurality of clock signals CLK having the same frequency respectively to the power converters 101 to 105 to trigger the power converters 101 to 105 to synchronously operate. The power converters 101 to 105 are configured to receive an input voltage VIN that is a DC voltage, and convert the input voltage VIN into an output voltage that is not equal to the input voltage VIN.

Figure 2:
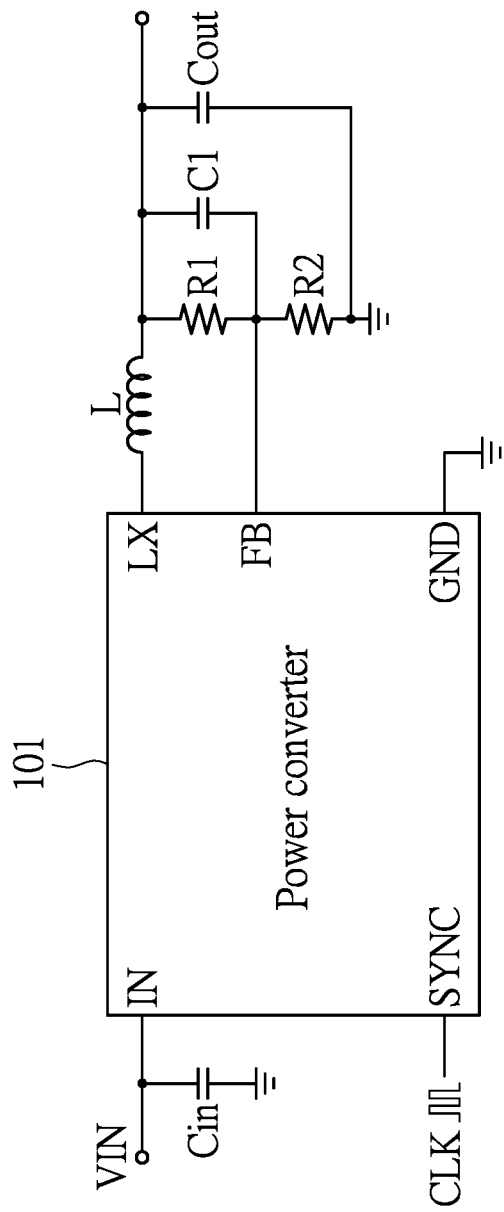
FIG. 2 is a circuit layout diagram of the power converter and external circuit components of the synchronous power converter system according to the embodiment of the present disclosure.

Reference is made to FIGS. 1 and 2, wherein FIG. 2 is a circuit layout diagram of the power converter and external circuit components of the synchronous power converter system according to the embodiment of the present disclosure. In the embodiment, only the power converter 101 is exemplified. It should be understood that configurations of the power converters 102 to 105 shown in FIG. 1 is the same as that of the power converter 101.

As shown in FIG. 2, an input terminal IN of the power converter 101 is connected in series with an input capacitor Cin and grounded through the input capacitor Cin. The input terminal IN of the power converter 101 obtains the input voltage VIN. A trigger terminal SYNC of the power converter 101 receives the clock signal having a constant frequency from the processer circuit 200 shown in FIG. 1. An output terminal LX of the power converter 101 is connected in series with an inductor L and an output capacitor Cout, and grounded through the inductor L and the output capacitor Cout. A voltage of a node between the inductor L and the output capacitor Cout is the output voltage of the power converter 101.

The node between the inductor L and the output capacitor Cout is connected to a voltage divider circuit. The voltage divider circuit is configured to divide the output voltage of the power converter 101 to output a feedback voltage. In detail, the voltage divider circuit includes a first resistor R1 and a second resistor R2. A feedback terminal FB of the power converter 101 is connected to a node between the first resistor R1 and the second resistor R2 and obtains a voltage of the node that is the feedback voltage. In addition, a first capacitor C1 is connected in parallel with the first resistor R1.

Figure 3:
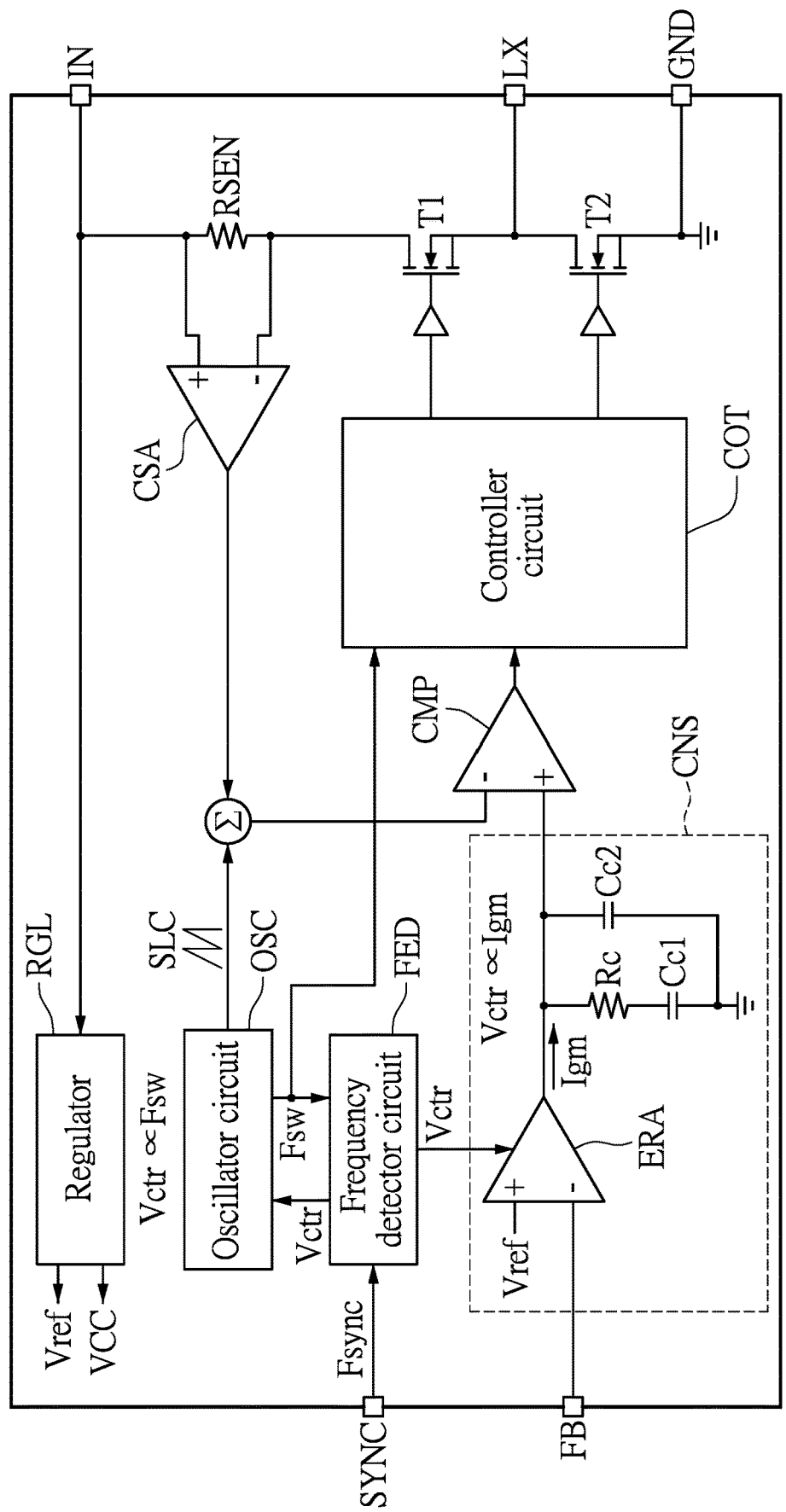
FIG. 3 is a circuit layout diagram of internal circuit components of the power converter of the synchronous power converter system according to the embodiment of the present disclosure.

Reference is made to FIGS. 1 to 3, wherein FIG. 3 is a circuit layout diagram of internal circuit components of the power converter of the synchronous power converter system according to the embodiment of the present disclosure.

Each of the power converters 101 to 105 shown in FIG. 1 may include an oscillator circuit OSC, a frequency detector circuit FED, a compensator circuit CNS, a controller circuit COT and a switch circuit as shown in FIG. 3. The switch circuit includes a first transistor T1 and a second transistor T2. The frequency detector circuit FED is connected to the processer circuit 200, the oscillator circuit OSC and the compensator circuit CNS.

As shown in FIGS. 1 and 3, the trigger terminal SYNC of the frequency detector circuit FED receives a clock signal CLK from the processer circuit 200 shown in FIG. 1 and receives an oscillation signal from the oscillator circuit OSC. The frequency detector circuit FED is configured to detect a clock frequency Fsync of the clock signal CLK and an oscillation frequency Fsw of the oscillation signal to output a frequency detected signal. The compensator circuit CNS outputs a compensating signal according to the frequency detected signal. The controller circuit COT controls the first transistor T1 and the second transistor T2 of the switch circuit according to the compensating signal.

For example, the compensator circuit CNS includes an error amplifier ERA. A first input terminal such as a non-interval input terminal of the error amplifier ERA receives a first reference voltage signal having a first reference voltage Vref. As shown in FIG. 2, a second input terminal such as an interval input terminal of the error amplifier ERA obtains the feedback voltage from the feedback terminal FB. The feedback voltage is a voltage divided from the output voltage of each of the power converters 101 to 105. A voltage input terminal of the error amplifier ERA is connected to the frequency detector circuit FED. Optionally, a regulator RGL may receive the input voltage VIN through the input terminal IN and regulate the first reference voltage Vref to be outputted to the error amplifier ERA according to the input terminal IN.

The frequency detector circuit FED outputs a frequency detected signal to the error amplifier ERA to control the error amplifier ERA to output an error amplified signal. In detail, the frequency detector circuit FED outputs the frequency detected signal for adjusting a transconductance gain (gm) of the error amplifier ERA. The error amplifier ERA is configured to multiply a difference between the first reference voltage Vref and the output voltage (or the feedback voltage divided from the output voltage) of each of the power converters 101 to 105 by the adjusted transconductance gain to output a current Igm. That is, the current Igm is used as the above-mentioned error amplified signal.

The compensator circuit CNS may further include a first compensation resistor Rc, a first compensation capacitor Cc1 and a second compensation capacitor Cc2. The compensation resistor Rc is connected to an output terminal of the error amplifier ERA. The compensation resistor Rc is connected in series with the first compensation capacitor Cc1 and grounded through the first compensation capacitor Cc1. A non-ground terminal of the second compensation capacitor Cc2 is connected to the output terminal of the error amplifier ERA. A ground terminal of the second compensation capacitor Cc2 is grounded. The current Igm flows to the first compensation resistor Rc, the first compensation capacitor Cc1 and the second compensation capacitor Cc2 from the error amplifier ERA.

Each of the power converters 101 to 105 may further include a comparator CMP, which is disposed between the compensator circuit CNS and the controller circuit COT. A first comparison input terminal such as an inverting input terminal of the comparator CMP may receive a second reference voltage. A second comparison input terminal such as a non-inverting input terminal of the comparator CMP is connected to the output terminal of the error amplifier ERA and the non-ground terminal of the second compensation capacitor Cc2. The second comparison input terminal of the comparator CMP receives the error amplified signal having a voltage of the second compensation capacitor Cc2. An output terminal of the comparator CMP is connected to the controller circuit COT.

For example, a current sensing amplifier CSA may be disposed between the comparator CMP and the switch circuit. The first comparison input terminal of the comparator CMP is connected to an output terminal of the current sensing amplifier CSA. A first terminal of the first transistor T1 of the switch circuit is connected to an input voltage source through a resistor RSEN and receives the input voltage VIN. The current sensing amplifier CSA detects a current flowing through the resistor RSEN to output a current detected signal. The above-mentioned second reference voltage may generated based on the current detected by the current sensing amplifier CSA and a slope compensating signal SLC of the oscillator circuit OSC by a second reference voltage source.

The second comparison input terminal of the comparator CMP receives the second reference voltage. The comparator CMP is configured to compare a voltage of the error amplified signal (which is the voltage of the second compensation capacitor Cc2) with the second reference voltage to output a comparing signal. The controller circuit COT controls the first transistor T1 and the second transistor T2 of the switch circuit according to the comparing signal.

Figure 4:
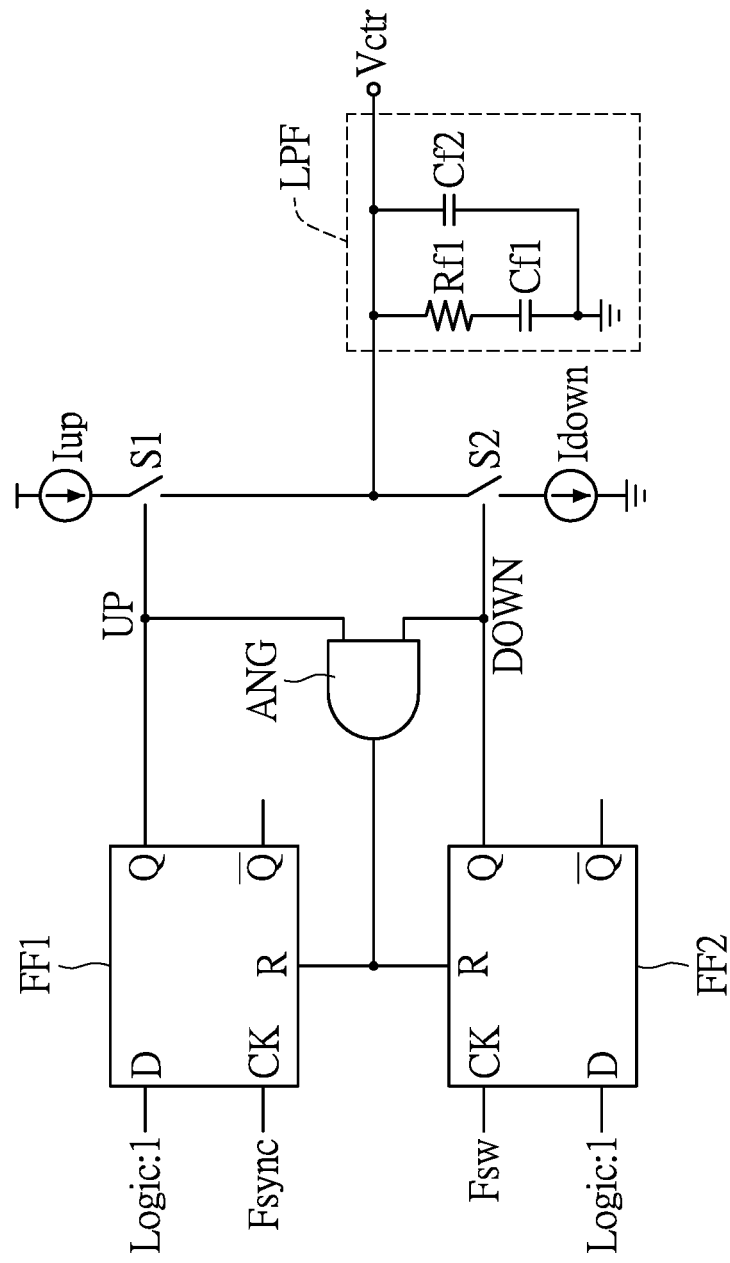
FIG. 4 is a circuit layout diagram of a frequency detector circuit of the power converter of the synchronous power converter system according to the embodiment of the present disclosure.
Figure 5:
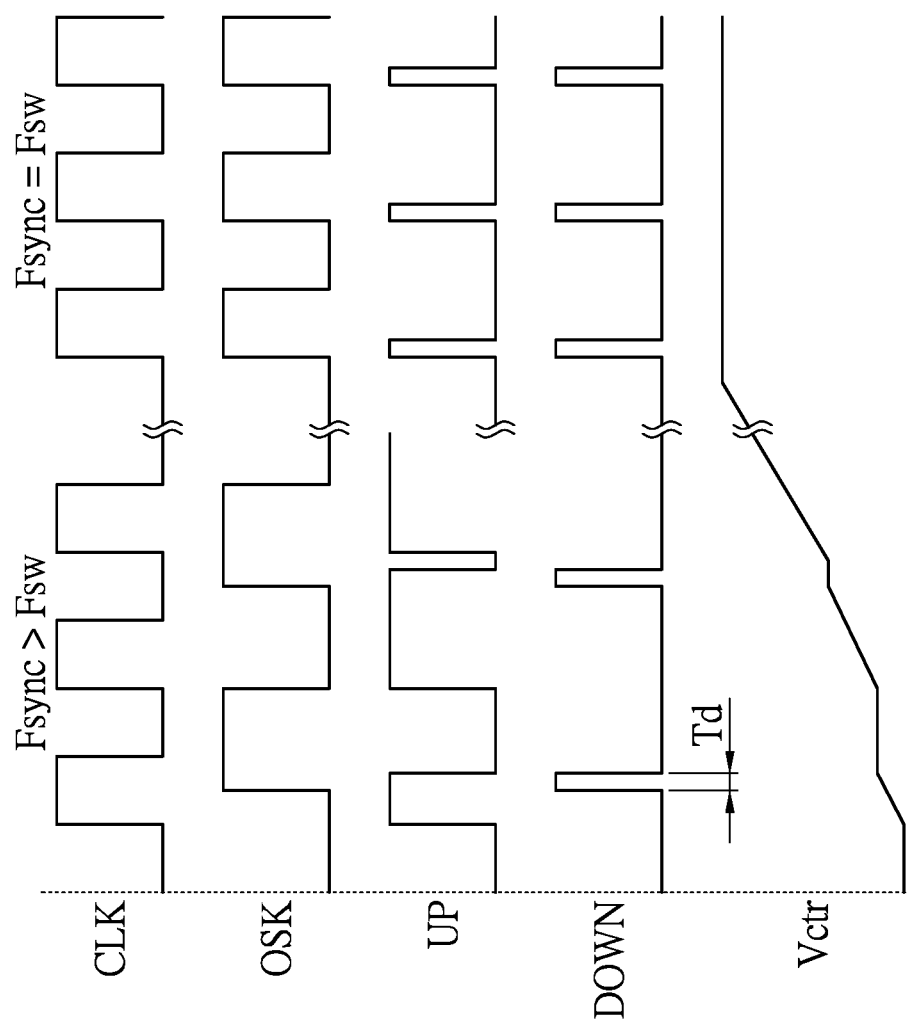
FIG. 5 is a waveform diagram of a clock signal, an oscillation signal, a logic signal and a voltage controlling signal of the synchronous power converter system according to the embodiment of the present disclosure.

Reference is made to FIGS. 1 to 5, wherein FIG. 4 is a circuit layout diagram of a frequency detector circuit of the power converter of the synchronous power converter system according to the embodiment of the present disclosure, and FIG. 5 is a waveform diagram of a clock signal, an oscillation signal, a logic signal and a voltage controlling signal of the synchronous power converter system according to the embodiment of the present disclosure.

The frequency detector circuit FED of the power converter as shown in FIG. 3 may include a first flip-flop FF1, a second flip-flop FF2 and a logic gate ANG as shown in FIG. 4. For example, the first flip-flop FF1 and the second flip-flop FF2 are D-type flip-flops, and the logic gate ANG is an AND gate.

A clock terminal CK of the first flip-flop FF1 is connected to the processor circuit 200. A clock terminal CK of the second flip-flop FF2 is connected to the oscillator circuit OSC. A reset terminal R of the first flip-flop FF1 and a reset terminal R of the second flip-flop FF2 are connected to an output terminal of the logic gate ANG. An output terminal Q of the first flip-flop FF1 is connected to one input terminal of the logic gate ANG and a control terminal of a first switch S1. The first flip-flop FF1 outputs a first flip-flop signal UP to control the first switch S1. A first terminal of the first switch S1 is connected to a first current source Iup. A second terminal of the first switch S1 is connected to a first terminal of a second switch S2. A control terminal of the second switch S2 is connected to another input terminal of the logic gate ANG and the output terminal Q of the second flip-flop FF2. The second flip-flop FF2 outputs a second flip-flop signal DOWN to control the second switch S2. A second terminal of the second switch S2 is connected to a second current source Idown. A node between the second terminal of the first switch S1 and the first terminal of the second switch S2 is connected to the voltage input terminal of the error amplifier ERA of the compensator circuit CNS.

Further, the first flip-flop FF1 further includes a filter circuit LP, which is connected to the node between the second terminal of the first switch S1 and the first terminal of the second switch S2, and connected to the controller circuit COT.

The filter circuit LPF may include a first filter resistor Rf1, a first filter capacitor Cf1 and a second filter capacitor Cf2. The first filter resistor Rf1 is connected to the node between the second terminal of the first switch S1 and the first terminal of the second switch S2. The first filter resistor Rf1 is connected in series with the first filter capacitor Cf1 and is grounded through the first filter capacitor Cf1. The second filter capacitor Cf2 is connected in parallel with to a series circuit of the first filter resistor Rf1 and the first filter capacitor Cf1.

An input terminal D of the first flip-flop FF1 of the frequency detector circuit FED of the power converter receives a logic signal at a high level. That is, the logic signal has a logic value Logic of "1". Under this condition, when the clock terminal CK of the first flip-flop FF1 of the power converter receives the clock signal CLK having the clock frequency Fsync at a high level from the processor circuit 200, the first flip-flop FF1 is triggered to output a first flip-flop signal UP at a high level, a logic value of which is "1".

An input terminal D of the second flip-flop FF2 of the frequency detector circuit FED of the power converter receives a logic signal at a high level, a logic value of which is "1". Under this condition, when the clock terminal CK of the second flip-flop FF2 of the power converter receives an oscillation signal OSK having the oscillation frequency Fsw at a high level as shown in FIG. 5 from the processor circuit 200, the second flip-flop FF2 is triggered to output a second flip-flop signal DOWN at a high level, a logic value of which is "1".

When the logic gate ANG is the AND gate, and two input terminals of which respectively receive the first flip-flop signal UP at a high logic level and the second flip-flop signal DOWN at a high logic level, the logic gate ANG outputs a logic gate signal at a high logic level respectively to the reset terminals R of the first flip-flop FF1 and the second flip-flop FF2. As a result, the first flip-flop FF1 and the second flip-flop FF2 are reset to clear the logic value Logic of "1". The first flip-flop FF1 and the second flip-flop FF2 respectively output the first flip-flop signal UP at a low logic level and the second flip-flop signal DOWN at a low logic level, logic values of which are "0", and await the next phase comparison.

A pulse width of the first flip-flop signal UP is approximately a phase difference between a feedback signal and the first reference voltage signal leading the feedback signal. As shown in FIG. 5, a working period of a pulse wave of the second flip-flop signal DOWN is a delay time Td, during which the first flip-flop FF1 and the second flip-flop FF2 are reset by the logic gate ANG. As shown in FIG. 5, the clock frequency Fsync of the clock signal CLK received by the power converter is higher than the oscillation frequency Fsw of the oscillation signal OSK, such that the pulse width of the first flip-flop signal UP is larger than a pulse width of the second flip-flop signal DOWN. When a current of the first current source Iup is equal to a current of the second current source Idown, and the pulse width of the first flip-flop signal UP is larger than the pulse width of the second flip-flop signal DOWN, the control voltage Vctr (which is a voltage of the second filter capacitor Cf2) of the voltage controlling signal outputted to the error amplifier ERA by the frequency detector circuit FED increases.

As a result, the oscillation frequency Fsw of the oscillation signal OSK outputted by the oscillator circuit OSC and a transduction gain (gm) increase with the increase of the control voltage Vctr, such that a switching frequency of the first transistor T1 and the second transistor T2 of the switch circuit accelerates. The current Igm outputted by the error amplifier ERA increases with the increase of the transduction gain (gm) such that a bandwidth of the power converter increases. Therefore, the power converter has a better load transient performance at a high frequency.

Finally, when the oscillation frequency Fsw of the oscillation signal OSK is equal to the clock frequency Fsync of the clock signal CLK received by the power converter as shown in FIG. 5, the first flip-flop signal UP and the second flip-flop signal DOWN have narrow pulse waves each having a pulse width of a delay time Td. Under this condition, when the current of the first current source Iup is equal to the current of the second current source Idown, the control voltage Vctr of the voltage control signal no longer changes.

Figure 6A:
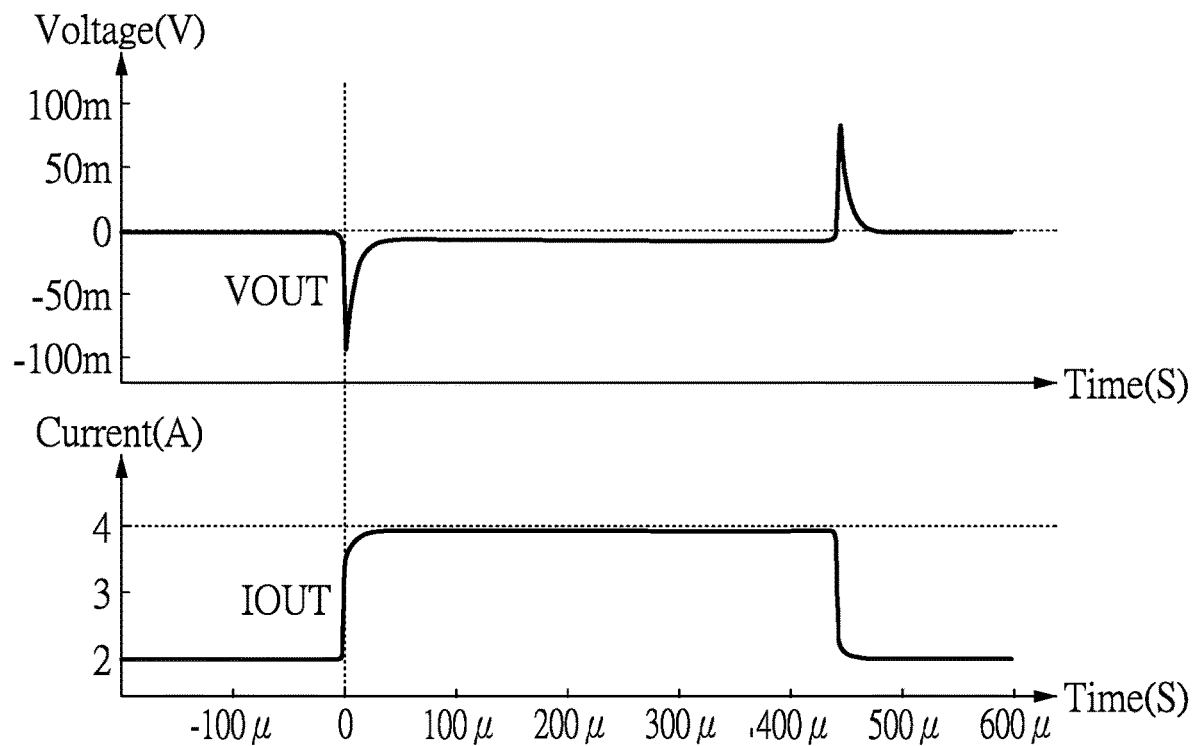
FIG. 6A is a signal waveform diagram of an output voltage and an output current of the power converter of the synchronous power converter system having a default frequency according to the embodiment of the present disclosure.
Figure 7A:
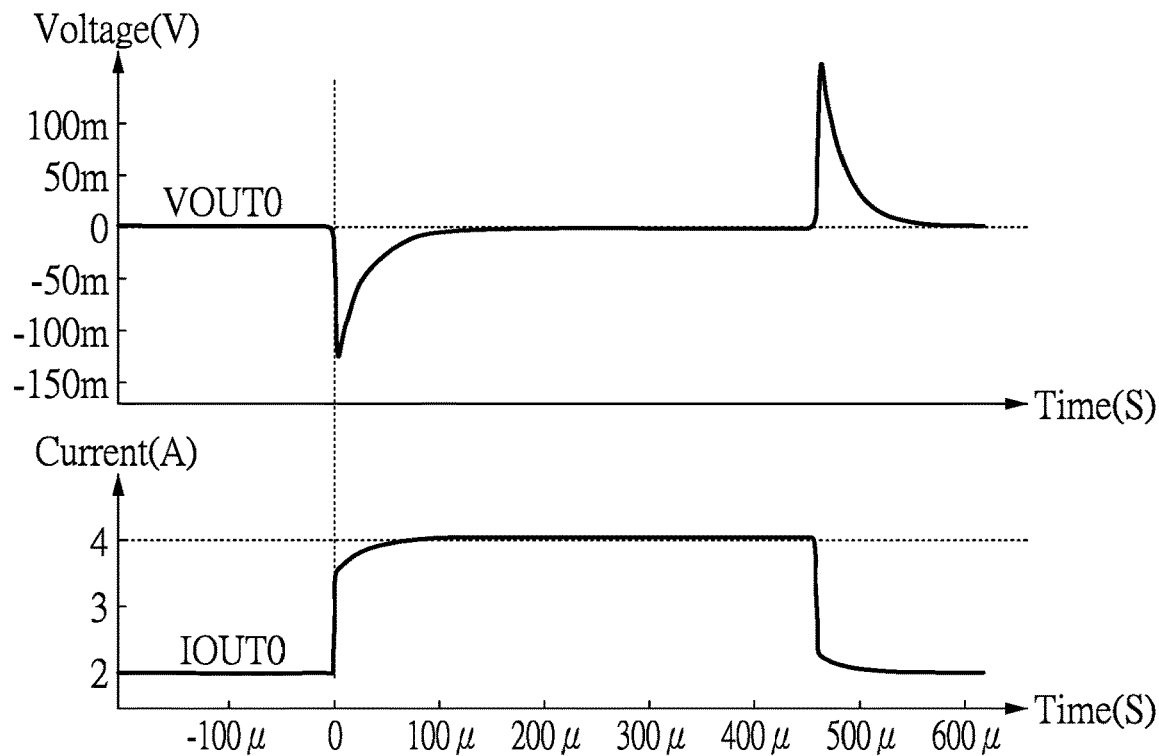
FIG. 7A is a signal waveform diagram of an output voltage and an output current of a conventional power converter having a default frequency.

Reference is made to FIGS. 6A and 7A, wherein FIG. 6A is a signal waveform diagram of an output voltage and an output current of the power converter of the synchronous power converter system having a default frequency according to the embodiment of the present disclosure, and FIG. 7A is a signal waveform diagram of an output voltage and an output current of a conventional power converter having a default frequency.

When the switching frequency of the conventional power converter is preset as a default frequency, and an input voltage and an output voltage of the conventional power converter are preset as respectively 12V and 1V, the conventional power converter generates an output current IOUT0 and an output voltage VOUT0 as shown in FIG. 7A. As shown in FIG. 7A, the output voltage VOUT0 of the conventional power converter at the default frequency drops 125 mV, resulting in a poor load transient performance of the power converter.

When the switching frequency of the power converter of the synchronous power converter system in the embodiment of the present disclosure is preset as a default frequency, and an input voltage and an output voltage of the power converter are preset as respectively 12V and 1V, the power converter generates an output current IOUT and an output voltage VOUT as shown in FIG. 6A. As shown in FIG. 6A, the output voltage VOUT of the power converter at the default frequency drops 97 mV.

Figure 6B:
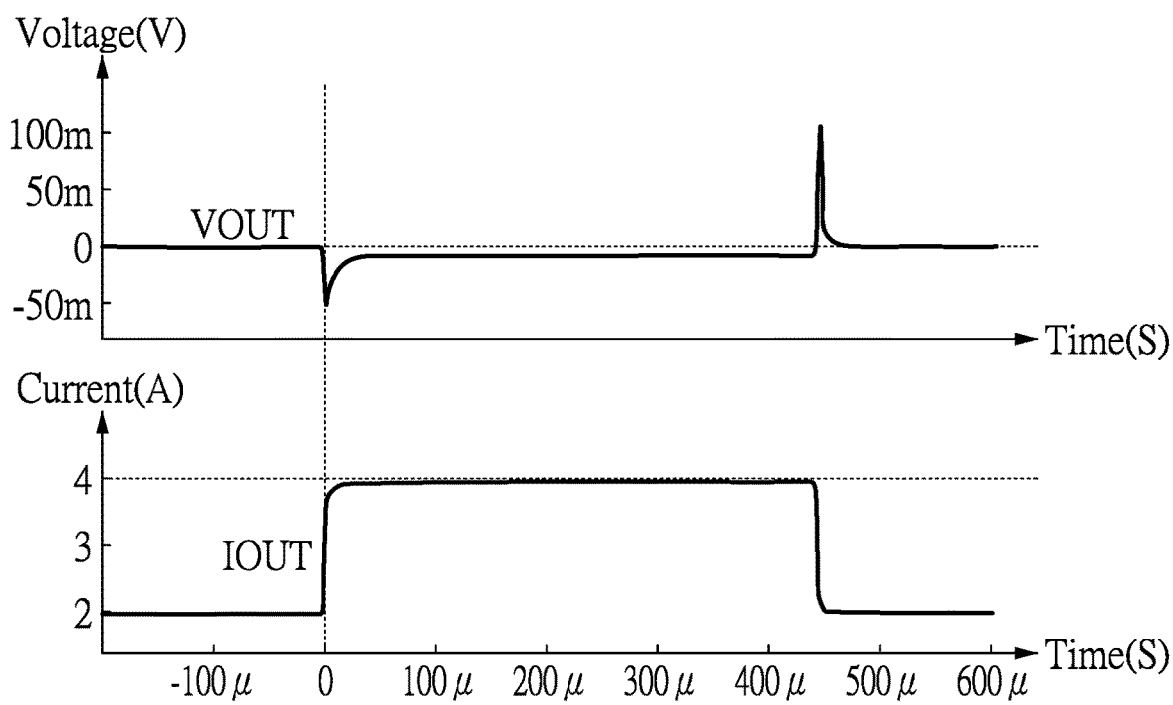
FIG. 6B is a signal waveform diagram of an output voltage and an output current of the power converter of the synchronous power converter system having a frequency of 1.38 MHz according to the embodiment of the present disclosure.
Figure 7B:
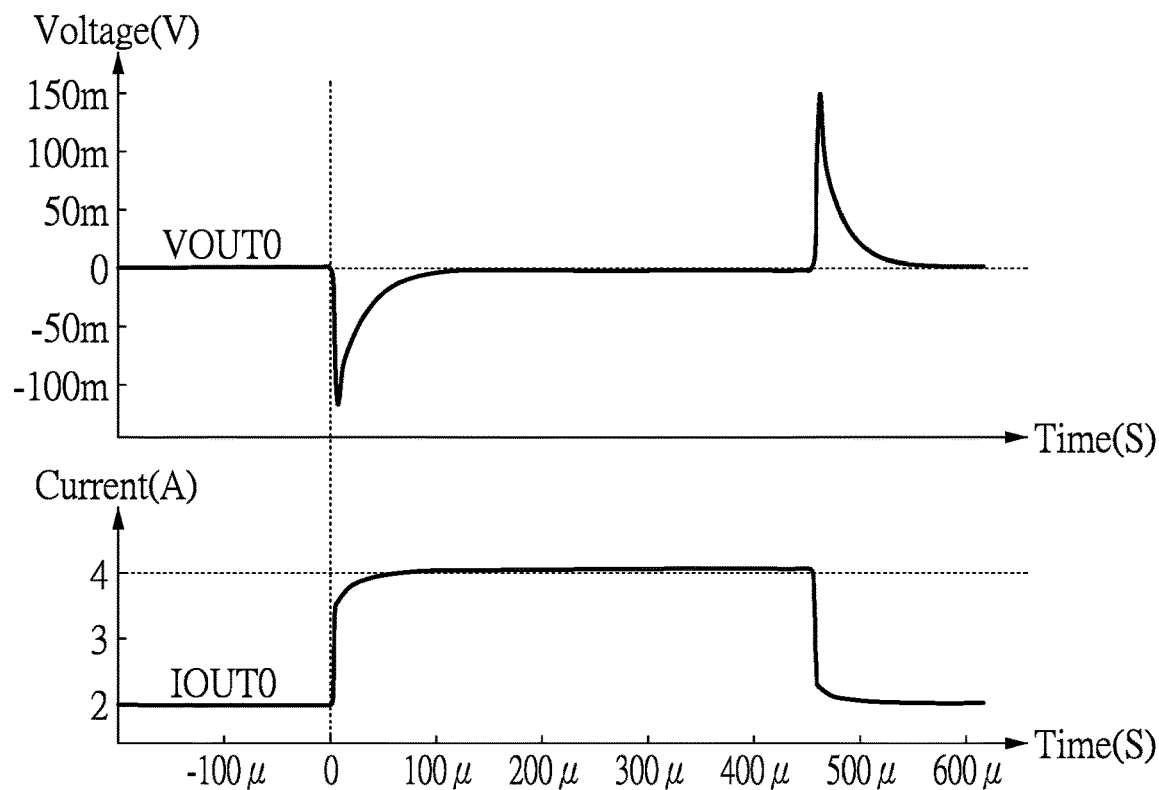
FIG. 7B is a signal waveform diagram of an output voltage and an output current of the conventional power converter having a frequency of 1.38 MHz.

Reference is made to FIGS. 6A, 6B, 7A and 7B, wherein FIG. 6B is a signal waveform diagram of an output voltage and an output current of the power converter of the synchronous power converter system having a frequency of 1.38 MHz according to the embodiment of the present disclosure, and FIG. 7B is a signal waveform diagram of an output voltage and an output current of the conventional power converter having a frequency of 1.38 MHz.

When the switching frequency of the conventional power converter is 1.38 MHz, the conventional power converter generates an output current IOUT0 and an output voltage VOUT0 that drops 117 mV as shown in FIG. 7B.

In contrast, when the switching frequency of the power converter of the synchronous power converter system in the embodiment of the present disclosure is 1.38 MHz, the power converter generates an output current IOUT and an output voltage VOUT that drops 53 mv as shown in FIG. 6B.

As shown in FIG. 7A and FIG. 7B, when the switching frequency of the conventional power converter increases from the default frequency to 1.38 MHz, the drop of the output voltage VOUT is reduced only from 125 mv to 117 mV. It is apparent that the drop of the output voltage VOUT0 is not improved significantly. In contrast, as shown in FIGS. 6A and 6B, in the system of the embodiment of the present disclosure, when the switching frequency of the power converter increases from the default frequency to 1.38 MHz, the drop of the output voltage VOUT is greatly reduced from 97 mV to 53 mV (the drop of 54% is improved), effectively improving the load transient performance of the power converter.

In summary, the present disclosure provides the synchronous power converter system, which provides the plurality of clock signals having the same clock frequency respectively to the plurality of power converters to trigger the power converters to operate synchronously. When the clock frequency of the clock signal increases to high frequency, the transconductance gain of the error amplifier is increased such that the bandwidth of the power converter increases. As a result, the drop of the output voltage of the power converter is reduced. Therefore, the load transient performance of the power converter is improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A synchronous power converter system, comprising:
a processor circuit configured to output a plurality of clock signals having the same frequency; and
a plurality of power converters configured to respectively receive the plurality of clock signals, wherein each of the power converters includes an oscillator circuit, a frequency detector circuit, a compensator circuit, a controller circuit and a switch circuit, the frequency detector circuit is connected to the processer circuit, the oscillator circuit and the compensator circuit, and the compensator circuit is connected to the controller circuit;
wherein the oscillator circuit outputs an oscillation signal, the frequency detector circuit receives the clock signal and the oscillation signal and detects a clock frequency of the clock signal and an oscillation frequency of the oscillation signal to output a frequency detected signal, the compensator circuit outputs a compensating signal according to the frequency detected signal, and the controller circuit controls the switch circuit according to the compensating signal.

2. The synchronous power converter system according to claim 1, wherein the compensator circuit includes an error amplifier connected to the frequency detector circuit and the controller circuit, the switch circuit is connected in series with an inductor and an output capacitor and grounded through the inductor and the output capacitor, a voltage of a node between the inductor and the output capacitor is an output voltage of the power converter, the frequency detected signal outputted by the frequency detector circuit includes a voltage controlling signal for controlling the error amplifier to output an error amplified signal according to a first reference voltage and the output voltage, and the controller circuit is configured to control the switch circuit according to the error amplified signal.

3. The synchronous power converter system according to claim 2, wherein a node between the inductor and the output capacitor is connected to a voltage divider circuit, the voltage divider circuit is configured to divide the output voltage to output a feedback voltage, and the error amplifier is configured to output the error amplified signal according to the feedback voltage and the first reference voltage.

4. The synchronous power converter system according to claim 2, wherein the compensator circuit includes a first compensation resistor, a first compensation capacitor and a second compensation capacitor, the first compensation resistor is connected to an output terminal of the error amplifier and grounded through the first compensation capacitor, and two terminals of the second compensation capacitor are respectively connected to the output terminal of the error amplifier and are grounded.

5. The synchronous power converter system according to claim 2, wherein each of the power converters further includes a comparator connected to the error amplifier and configured to compare a voltage of the error amplified signal and a second reference voltage to output a comparing signal, and the controller circuit is configured to control the switch circuit according to the comparing signal.

6. The synchronous power converter system according to claim 5, wherein the switch circuit is connected to an input voltage source through a resistor, each of the power converters further includes a current sensing amplifier configured to detect a current flowing through the resistor to output a current detected signal, and the comparator is configured to compare the voltage of the error amplified signal with the second reference voltage generated by the current detected signal to output the error amplified signal.

7. The synchronous power converter system according to claim 1, wherein the frequency detector circuit includes a first flip-flop, a second flip-flop and a logic gate, the first flip-flop is connected to the processor circuit, the second flip-flop is connected to the oscillator circuit, a reset terminal of the first flip-flop and a reset terminal of the second flip-flop are connected to an output terminal of the logic gate, an output terminal of the first flip-flop is connected to one input terminal of the logic gate and a control terminal of a first switch, a first terminal of the first switch is connected to a first current source, a second terminal of the first switch is connected to a first terminal of a second switch, a control terminal of the second switch is connected to another input terminal of the logic gate and an output terminal of the second flip-flop, a second terminal of the second flip-flop is connected to a second current source, and a node between the second terminal of the first switch and the first terminal of the second switch is connected to the compensator circuit.

8. The synchronous power converter system according to claim 7, wherein the first flip-flop and the second flip-flop are D-type flip-flops, and the logic gate is an AND gate.

9. The synchronous power converter system according to claim 7, wherein the frequency detector circuit further includes a filter circuit connected to the node between the second terminal of the first switch and the first terminal of the second switch, and connected to the controller circuit.

10. The synchronous power converter system according to claim 9, wherein the filter circuit includes a first filter resistor, a first filter capacitor and a second filter capacitor, the first filter resistor is connected to the node between the second terminal of the first switch and the first terminal of the second switch, the first filter resistor is connected in series with the first filter capacitor and grounded through the first filter capacitor, and the second filter capacitor is connected in parallel with a series circuit of the first filter resistor and the first filter capacitor.

* * * * *